Figure 1:
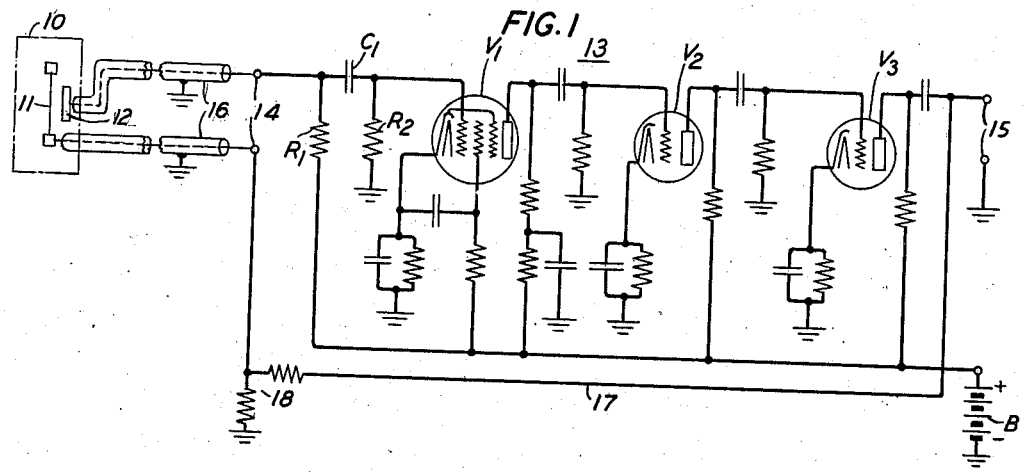

March 19, 1946.    R. R. GALBREATH    2,396,691

CONDENSER TRANSMITTER AMPLIFIER SYSTEM

Filed June 19, 1941

INVENTOR
R. R. GALBREATH
BY
Robert J. Pluskey
ATTORNEY

Patented Mar. 19, 1946

2,396,691

UNITED STATES PATENT OFFICE 2,396,691

CONDENSER TRANSMITTER-AMPLIFIER SYSTEM

Robert R. Galbreath, East Orange, N. J., assignor to Bell Telephone Laboratories, Incorporated, New York, N. Y., a corporation of New York Application June 19, 1941, Serial No. 398,740

11 Claims. (Cl. 179—1)

This invention relates to electromechanical systems and, more particularly, to an electroacoustical system, for example, a condenser transmitter-amplifier combination.

The general combination of a condenser transmitter or microphone and an audio frequency amplifier is, of course, well known. It has been proposed for and used in sound wave translating and recording systems, in public address systems, and in equipment for testing microphones and telephonic and loud-speaking receivers. With an appropriately constructed microphone, the general combination may be used, also, to detect and to measure vibrations of a vibrating body, or to measure low frequency pressures, such as are developed, for example, in internal combustion engines. The transmitter may be arranged fixedly in close proximity to the amplifier, for example, being carried on the frame or housing supporting the amplifier, or may be connected to input terminals of the amplifier through a suitable cord or a plurality of separate conductors, usually not in excess of five or six feet in length. The transmitter and the initial stage of the amplifier are frequently coupled through a resistance-condenser network, the resistances generally being of a high value, for example, of the order of 30 to 200 megohms. The output impedance of the amplifier is usually such as to match the impedance of the load.

The gain-frequency characteristic of the transmitter-amplifier combination varies with variation in the capacity of the transmitter, or of that of the cord or conductors connecting it with the amplifier, and also with variation in direct current leakage from the high potential side of the transmitter to ground. The condenser transmitter capacity may vary from transmitter to transmitter associated with the amplifier; the cord capacity may vary from cord to cord, with changes in its length in use because wear at the ends may require that it be shortened, and with its position, or because an existing cord is replaced by one of different length; the direct current leakage varies with the atmospheric conditions. Variations in the impedance of the load into which the amplifier works also have their deleterious effect.

An object of this invention is to improve electromechanical systems comprising a transmitter-amplifier combination.

A further object of the invention is to provide such an arrangement for a condenser transmitter-amplifier circuit that the gain-frequency characteristic of the circuit is substantially constant over the entire audio frequency range despite variations in transmitter or cord capacity, or in load impedance, and the effect of direct current leakage on the gain is minimized.

In accordance with the invention, a condenser transmitter is connected to the input terminals of an amplifier so as to be included in a gain-reducing negative feedback connection from the output circuit to the input circuit of the amplifier, the feedback connection being of the so-called shunt-series type whereby the output impedance of the amplifier is reduced to a low value.

Figure 2:
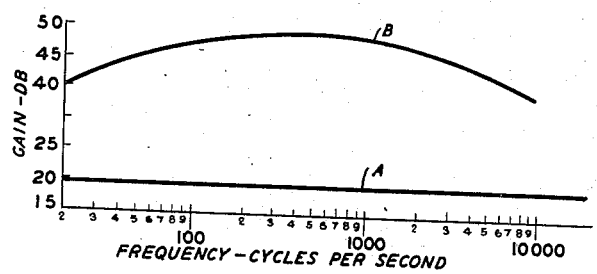

A more complete understanding of the invention will be derived from the detailed description that follows, taken in conjunction with the appended drawing, wherein:

Fig. 1 shows a condenser transmitter-amplifier circuit arrangement in accordance with the invention;

Fig. 2 shows gain-frequency characteristic curves for the arrangement of Fig. 1 with and without feedback; and Figs. 3, 4, 5 and 6 show curves illustrating the gain change in a transmitter-amplifier circuit arrangement in accordance with the invention as compared with one of the prior art, with variation in transmitter capacity, connecting cord or conductor capacity, load resistance, and polarizing resistor resistance, respectively.

Fig. 1 shows a circuit arrangement embodying the invention. It comprises a condenser transmitter or microphone 10 having a vibratory diaphragm or front electrode 11 and a rear and stationary electrode 12; a multistage audio frequency amplifier 13 having input terminals 14 and output terminals 15; and a cord or electrical conductor means 16, that may comprise a pair of short lengths of coaxial line, for connecting the transmitter electrodes with the input terminals of the amplifier, the outer conductor or sheath being connected to ground.

The electron discharge devices V1, V2, V3 are resistance-capacity coupled, with the initial device coupled to the input terminals through high resistances R1, R2 and the blocking condenser C1. Polarizing potential for the transmitter, as well as anode potential and space current for the discharge devices, are supplied from a suitable source B of power, for example, a battery. A feedback connection 17 is provided between one output terminal of the amplifier and the input terminal thereof connected to the low potential electrode or terminal of the transmitter. The feedback connection contains a suitable attenuator pad 18, and is adapted to feed back energy from the output circuit of the amplifier to the input circuit thereof in such phase and with such magnitude as substantially to reduce the gain of the amplifier over the audio frequency range. Fig. 2 shows a curve A the gain-frequency characteristic of a circuit arrangement substantially such as is shown in Fig. 1 constructed in accordance with the invention, and in curve B the gain-frequency characteristic of the same arrangement but without the negative feedback. In effect, the provision of negative feedback increases the input impedance with respect to the terminals 14, reduces the impedance between the lower input terminal and ground, and reduces the amplifier output impedance at terminals 15. In a particular condenser microphone-amplifier combination without the feedback, the output impedance was of the order of about 600 ohms and, with the feedback, it was reduced to the order of about 20 ohms. The basic principles of gain-reducing negative feedback have been disclosed in H. S. Black Patent 2,102,671, patented December 21, 1937, and the arrangement of Fig. 1 embodies feedback of that general type. Not only does the provision of gain-reducing negative feedback enable the obtaining of a gain-frequency characteristic that is substantially flat over the entire audio frequency range, the characteristic remains stable regardless of considerable variation in the capacity of the transmitter or of the cord conductors 16, or in the value of the load resistance. A much lower resistance for the polarizing resistor may be used than has heretofore apparently been possible.

This is illustrated by the curves of Figs. 3, 4, 5 and 6 which show the change in gain of two amplifiers for independent variation of each of the following variables about their nominal values: transmitter capacity, cord capacity, load resistance, and resistance in the polarizing circuit. The measurements were made at 50 cycles per second since the effect of their variation on gain tends to be most prominent at low frequencies. The nominal transmitter capacity in each case was approximately 50 micro-microfarads, and that of the conductors connecting the transmitter and the amplifier approximately 200 micro-microfarads; the load resistance was 600 ohms. The curves labeled "Amp. B" are for a condenser transmitter-amplifier combination such as is shown in Fig. 1, and those labeled "Amp. A" are for a condenser transmitter-amplifier combination representative of the type heretofore available, i. e., that do not embody gain-reducing negative feedback.

Figure 3:
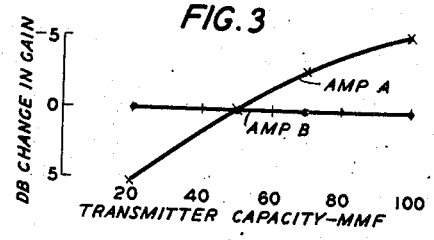
Figure 4:
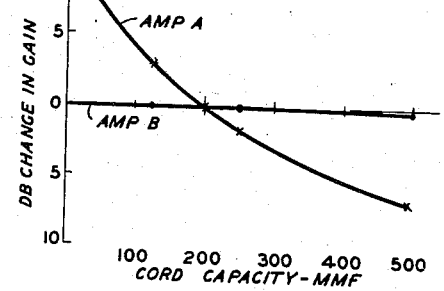
Figure 6:
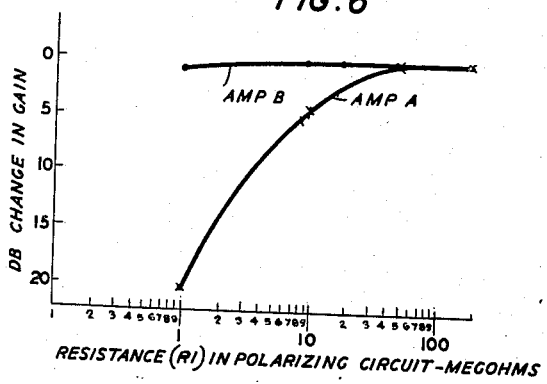
Figure 5:
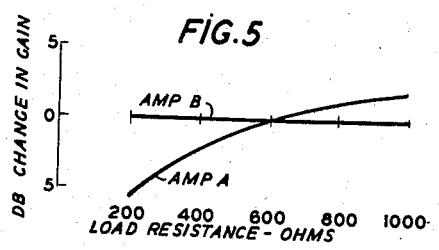

Fig. 3 shows that for a range of transmitter capacity which probably covers the majority of condenser transmitters in general use, the gain of Amp. A changes 1.2 decibels, and that, for Amp. B, the change is considerably less than .1 decibel. Fig. 4 indicates that even a small percentage change in the steady state capacity of the cord or other electrical conductor means between the transmitter and amplifier causes a substantial gain change in the prior art circuit arrangement, whereas even a great capacity change has substantially no effect in the case of the circuit arrangement of Fig. 1. Fig. 5 illustrates that a variation in load resistance from 200 to 1000 ohms causes a gain change of approximately .2 decibel for Amp. B, as contrasted with a gain change of approximately 7.8 decibels with the prior art arrangement. Fig. 6 shows the effect of changing the value of resistor R1, and indicates that with the negative feedback arrangement resistances of the order of 10 megohms or even lower can be used without sacrificing low frequency response.

Although the invention has been disclosed with reference to a specific embodiment, it is to be understood that it is not limited thereto but is of a scope indicated by the appended claims.

What is claimed is:

1. In combination, an audio frequency amplifier having an input circuit and an output circuit, a microphone connected in the input circuit of said amplifier, and a feedback connection of the shunt-series type from the output circuit to the input circuit adapted to feed back energy in such phase and with such magnitude as substantially to reduce the gain of the amplifier below the value with no feedback from the output circuit to the input circuit, said connection including said microphone.

2. In combination, an audio frequency amplifier having an input circuit and an output circuit, a microphone connected in the input circuit of said amplifier, and a feedback connection from the output circuit to the input circuit adapted to feed back energy in such phase and with such magnitude as substantially to reduce the over-all gain of said amplifier below its value with no feedback from the output circuit to the input circuit, said connection including said microphone.

3. In combination, an audio frequency amplifier having an input circuit and an output circuit, a condenser microphone connected in the input circuit of said amplifier, and a feedback connection from the output circuit to the input circuit adapted to feed back energy in such phase and with such magnitude as substantially to reduce the over-all gain of said amplifier below its value for no feedback from the output circuit to the input circuit, said connection including said condenser microphone.

4. In combination, an audio frequency amplifier having an input circuit and an output circuit, a microphone connected in the input circuit of said amplifier, said microphone being of a type that varies in capacity from microphone to microphone whereby the capacity of the input circuit of the amplifier may be different for different microphones, and a feedback connection from the output circuit to the input circuit of said amplifier and including said microphone, adapted to feed back energy in such phase and with such magnitude as substantially to reduce the gain of said amplifier below its value with no feedback from the output circuit to the input circuit and thereby maintain the gain-frequency response characteristic of the combination substantially constant despite variation in the capacity of the microphone.

5. In combination, a condenser microphone, an amplifier having an input circuit and an output circuit, a cord connecting said microphone to the input circuit of the amplifier, means for polarizing said microphone, and a feedback connection from the output of said amplifier to the latter's input circuit adapted to render the total feedback from the output circuit to the input circuit negative and of substantial magnitude, said connection including said microphone and said connecting cord.

6. In combination, an audio frequency amplifier including input terminals, an input circuit and an output circuit for said amplifier, a condenser microphone, electrical conductor means for connecting said microphone to said input terminals, a source of polarizing potential for said microphone connected with one terminal of said microphone through one amplifier terminal and said conductor means, said microphone and said conductor means being of a type that may vary in steady state capacity, whereby the gain-frequency characteristic of the combination may vary, and a feedback connection including said microphone and said conductor means from the output of said amplifier to the latter's input circuit, adapted to feed back energy in such phase and with such magnitude as substantially to reduce the over-all gain of said amplifier below its value with no feedback from the output circuit to the input circuit, whereby the gain-frequency characteristic of the combination remains substantially constant despite the beforementioned variations in capacity.

7. A condenser microphone-amplifier combination comprising a condenser microphone, an amplifier, a condenser coupling one terminal of the microphone to an input terminal of the amplifier, means for polarizing said microphone including a source of polarizing potential and a resistor connected with said one terminal of the microphone in shunt relation to the transmission path through the amplifier, said resistor having a resistance of the order of 10 megohms, and means connecting in serial relation the microphone, the input impedance of the amplifying element of the amplifier and a portion of the output circuit of the amplifier and adapted to feed back energy from the amplifier output circuit to the amplifier input circuit in such phase and with such magnitude as to reduce the gain of the amplifier substantially below its value for no feedback from the amplifier output circuit to the amplifier input circuit.

8. In combination, a condenser microphone having a movable electrode and a stationary electrode, an electron discharge device including a vacuum tube having a control grid and a cathode, a connection from said stationary electrode to said grid including a blocking condenser, means for polarizing said microphone including a source of polarizing potential and a resistor connected to said stationary electrode in shunt relation to the series circuit through said blocking condenser and the space path between said grid and cathode in said tube, said resistor having a resistance of the order of about 10 megohms, and means connecting in serial relation said microphone, said space path and a portion of the output circuit of said device, and adapted to feed back energy from the output circuit of said device to said space path in such phase and with such magnitude as to reduce the gain of said device substantially below its value with no feedback from the output circuit of said device to said space path.

9. In combination, a condenser microphone having a movable electrode and a stationary electrode, an electron discharge device amplifier having input terminals one of which is connected to a grid of said amplifier and having output terminals, a conductor connecting said stationary electrode and said one of said input terminals, a second conductor connecting said movable electrode and the other of said input terminals, each of said conductors having a coaxial grounded shield, and a gain-reducing negative feedback connection from one of said output terminals through said condenser microphone and said conductors to said one of said input terminals, adapted to feed back energy in such phase and with such magnitude as to reduce the gain of said amplifier substantially below its value with no feedback from the output terminals to the input terminals.

10. A condenser microphone-amplifier combination comprising an amplifier, a condenser microphone for feeding the amplifier, and a feedback connection including the microphone, adapted to feed back around the amplifier voltage dependent on that across the amplifier output terminals in such phase and with such magnitude as to reduce the gain of the amplifier in said combination over the audio frequency range substantially below its value for no feedback around the amplifier and lower the output impedance of the amplifier to a value small in comparison to its value without the feedback.

11. A condenser microphone-amplifier combination comprising an amplifier, a condenser microphone for feeding said amplifier, a feedback connection from the output to the input of the amplifier including said microphone and adapted to feed back energy in such phase and with such magnitude as to reduce the amplifier gain substantially below its value for no feedback from the output to the input of the amplifier, and means for polarizing said microphone including a potential source and a resistor between said source and microphone, said resistor being of a resistance low in comparison with that required in a combination covering the same frequency range but without the gain-reducing feedback.

ROBERT R. GALBREATH.